United States Patent [19]
Tokuda

[11] Patent Number: 5,887,909
[45] Date of Patent: Mar. 30, 1999

[54] JOINT FOR DIFFERENT-DIAMETER PIPES AND METHOD OF CONNECTING DIFFERENT-DIAMETER PIPES

[75] Inventor: Koichiro Tokuda, Osaka, Japan

[73] Assignee: Totaku Industries, Inc., Osaka, Japan

[21] Appl. No.: 656,990

[22] Filed: Jun. 6, 1996

[30] Foreign Application Priority Data

Jun. 13, 1995 [JP] Japan ..................................... 7-171351

[51] Int. Cl.⁶ .............................. F16L 47/02; F16L 17/02
[52] U.S. Cl. .................................. 285/148.9; 285/148.18; 285/294.3; 285/369; 285/903; 285/915
[58] Field of Search ........................... 285/148.12, 148.9, 285/148.7, 148.25, 903, 915, 148.24, 148.18, 294.3, 369, 159

[56] References Cited

U.S. PATENT DOCUMENTS

| | | | |
|---|---|---|---|
| 170,473 | 11/1875 | Flagler et al. | 285/294.3 X |
| 333,011 | 12/1885 | Hoeveller | 285/294.3 X |
| 1,292,072 | 1/1919 | Rooney | 285/294.3 |
| 1,737,242 | 11/1929 | Hooley | 285/374 X |
| 2,313,074 | 3/1943 | Jewell | 285/294.3 |
| 4,523,779 | 6/1985 | Knox | 285/294.3 |
| 5,415,440 | 5/1995 | Kanao . | |
| 5,478,123 | 12/1995 | Kanao . | |
| 5,486,024 | 1/1996 | Dierdorf | 285/294.3 |

FOREIGN PATENT DOCUMENTS

| | | |
|---|---|---|
| 6-99513 | 4/1994 | Japan . |
| 7-127780 | 5/1995 | Japan . |
| 8-285158 | 11/1996 | Japan . |
| 1148196 | 4/1969 | United Kingdom ................... 285/159 |
| WO 95/02144 | 1/1995 | WIPO . |

Primary Examiner—Heather Shackelford
Attorney, Agent, or Firm—Whitham, Curtis & Whitham

[57] ABSTRACT

A joint which is a cylindrical body having an inner circumferential surface, a diameter of which is larger than any of outer diameters of two pipes to be connected, the cylindrical body being provided with an annular projecting strip portion formed in an approximately axially intermediate portion so as to project radially inward, first and second cylindrical portions respectively disposed on opposite sides of the annular projecting strip, annular projecting portions projecting radially outward so as to form annular space portions in approximately intermediate portions of the first and second cylindrical portions respectively, and through holes formed respectively in the annular projecting portions for injecting a foamable and curable liquid agent. A method of connecting pipes by use of the above pipe joint, includes the steps of bonding sealing bodies of a compressible and deformable material onto the outer circumferential surfaces of the two pipes to be connected or the inner circumferential surfaces of the joint; pressing the pipes into the joint; injecting a foamable and curable liquid agent into inside space portions through corresponding through holes so as to fill the internal space portions with a foamed and expanded hardened substance of the liquid agent injected therein to thereby connect the pipes to the joint water-tightly.

18 Claims, 5 Drawing Sheets

JOINT FOR DIFFERENT-DIAMETER PIPES AND METHOD OF CONNECTING DIFFERENT-DIAMETER PIPES

BACKGROUND OF THE INVENTION

The present invention relates to a pipe joint suitable for making interconnection between corrugated pipes which are formed of synthetic resin so as to have corrugated outer-circumferential surfaces, particularly pipes which are different from each other in shape of corrugation or in outer diameter, and further relates to a method of connecting different-diameter pipes to each other by use of such a pipe joint.

Such type of conventional pipe joints may be roughly classified into a joint for pipes having pipe walls corrugated spirally, and a joint for pipes having pipe walls corrugated annularly. Generally, the former joint for spirally corrugated pipes has such a structure that the whole (inner and outer) shapes or at least the inner circumferential surface of the joint is formed into a spirally corrugated shape which can fit the spirally corrugated shapes of pipes to be connected, while the latter joint for annularly corrugated pipes has a halved structure because of impossibility of plug-in connection of pipes into the joint.

Both of those conventional pipe joints, that is, the former joint and the latter joint, are formed for the purpose of making connection between two pipes which are identical in shape of corrugation and which are equal in outer diameter (hereinafter referred to as "same-shaped pipes"), that is, pipes having the same predetermined shape.

Therefore, any of the conventional pipe joints, that is, any of the joint for spirally corrugated pipes and the joint for annularly corrugated pipes, cannot be used for connecting pipes which are different in diameter or in shape of corrugation other than same-shaped pipes having a predetermined size, that is, pipes with a shape other than a predetermined shape. In addition, in the joint for spirally corrugated pipes, it is required to rotate long pipes relative to the joint when the pipes are to be spirally connected to the joint, while in the joint for annularly corrugated pipes, it is required to combine the two parts of the halved joint by means of fastening bolts, or the like. Accordingly, there has been such a problem in either joint that it takes time and labor to connect pipes, and it is impossible to perform piping work rapidly.

SUMMARY OF THE INVENTION

It is therefore an object of the present invention to solve the foregoing problems belonging to the conventional joints. It is another object of the present invention to provide a pipe joint which can connect pipes to each other even if the pipes are different from each other in diameter or in shape of corrugation, and to provide a connection method by which even connection between pipes which are different in diameter or in shape of corrugation can be performed as effectively as in the case of the connection between the same-shaped pipes.

The configuration of the joint according to the present invention is such that the joint is a cylindrical body having an inner circumferential surface, a diameter of which is larger than any of outer diameters of two pipes to be connected, the cylindrical body being provided with an annular projecting strip portion formed in an approximately axially intermediate portion so as to project radially inward, first and second cylindrical portions respectively disposed on opposite sides of the annular projecting strip, annular projecting portions projecting radially outward so as to form annular space portions in approximately intermediate portions of the first and second cylindrical portions respectively, and through holes formed respectively in the annular projecting portions for injecting a foamable and curable liquid agent.

Such a pipe joint may be realized in such a manner that the first and second cylindrical portions have sealing bodies respectively, the sealing bodies being bonded on inner circumferential surfaces on the opposite sides of the annular projecting portion and on inner circumferential surfaces on the opposite sides of the annular projecting portion respectively, and being formed of a compressible and deformable material, or that the thickness of the sealing body formed on the first cylindrical portion is different from that of the sealing body formed on the second cylindrical portion.

In addition, in a method of connecting pipes by use of a pipe joint having such a structure, sealing bodies of a compressible and deformable material are bonded onto inner circumferential surfaces on the opposite sides of the annular projecting portion of the first cylindrical portion respectively, each of the sealing bodies having such a thickness that the inner diameter of the first cylindrical portion after the sealing bodies are bonded thereto is approximately equal to or slightly smaller than the outer diameter of the pipe which is one of the pipes to be connected, and sealing bodies of a compressible and deformable material are bonded onto inner circumferential surfaces on the opposite sides of the annular projecting portion of the second cylindrical portion respectively, each of the sealing bodies having such a thickness that the inner diameter of the second cylindrical portion after the sealing bodies are bonded thereto is approximately equal to or slightly smaller than the outer diameter of the pipe which is the other one of the pipes to be connected; the pipes are pressed into the first and second cylindrical portion 11 and 12 respectively; and a foamable and curable liquid agent is injected into the inside space portions through the corresponding through holes so that the space portions are filled with foamed and expanded hardened substance of the liquid agent injected therein to thereby connect the pipes water-tightly.

In addition, the connection using such a joint as mentioned above may be performed in a method comprising the steps of: bonding sealing bodies of a compressible and deformable material onto outer circumferential surface portions of two pipes near respective ends of the two pipes to be connected to each other, the sealing bodies confronting the opposite sides of the respective annular projecting portions of the joint when the pipes are inserted into the joint, each of the sealing bodies having such a thickness that the outer diameter of the pipe on which the sealing body is bonded is approximately equal to or slightly larger than the inner diameter of the joint; pressing the pipes into the first and second cylindrical portions respectively; and injecting a foamable and curable liquid agent into the inside space portions through the corresponding through holes so that the space portions are filled with the foamed and expanded hardened substance of the liquid agent injected therein to thereby connect the pipes water-tightly.

Not limited specifically, preferably, the material of the joint according to the present invention may be a hard and thermoplastic synthetic resin material such as hard polyethylene, hard polypropylene, hard polyvinyl chloride, or the like, which is easy to be formed and difficult in aged deterioration. The sealing bodies which are compressible and deformable, and which are to be bonded to the inner circumferential surface of the joint, are preferably formed of a comparatively soft material or foamed material of rubber, synthetic resin, or the like so as to be easily compressed and deformed at the time of pressing pipes into the joint. In addition, although the sealing bodies do not have specific sectional shapes, they are preferably shaped into flat bands or rectangular bands, which are easily bonded to the inner circumferential surface of the joint. In this case, it is convenient to bond the sealing bodies onto the inner circumferential surfaces of the joint easily and rapidly if a bonding agent such as a pressure-sensitive bonding agent is applied onto one side (bonded side) of each sealing body.

In the pipe joint according to the present invention having such a structure as described above, when pipes are to be connected to each other, sealing bodies respectively having thicknesses corresponding to the outer diameters of the two pipes to be connected are selected, and bonded to the inner circumferential surfaces of the joint respectively, and one pipe is pressed into the first cylindrical portion while the other pipe is pressed into the second cylindrical portion as mentioned above in the connection method. Then, a foamable and curable liquid agent is injected through corresponding through holes formed in the annular projecting portions, respectively, so as to fill the space portions with the foamed and expanded hardened substance of the curable liquid agent. Thus, the two pipes can be connected to the joint water-tightly, easily and rapidly.

DETAILED DESCRIPTION OF THE PREFERRED EMBODIMENTS

Preferred embodiments of the present invention will be described below with reference to the drawings.

Figure 1:
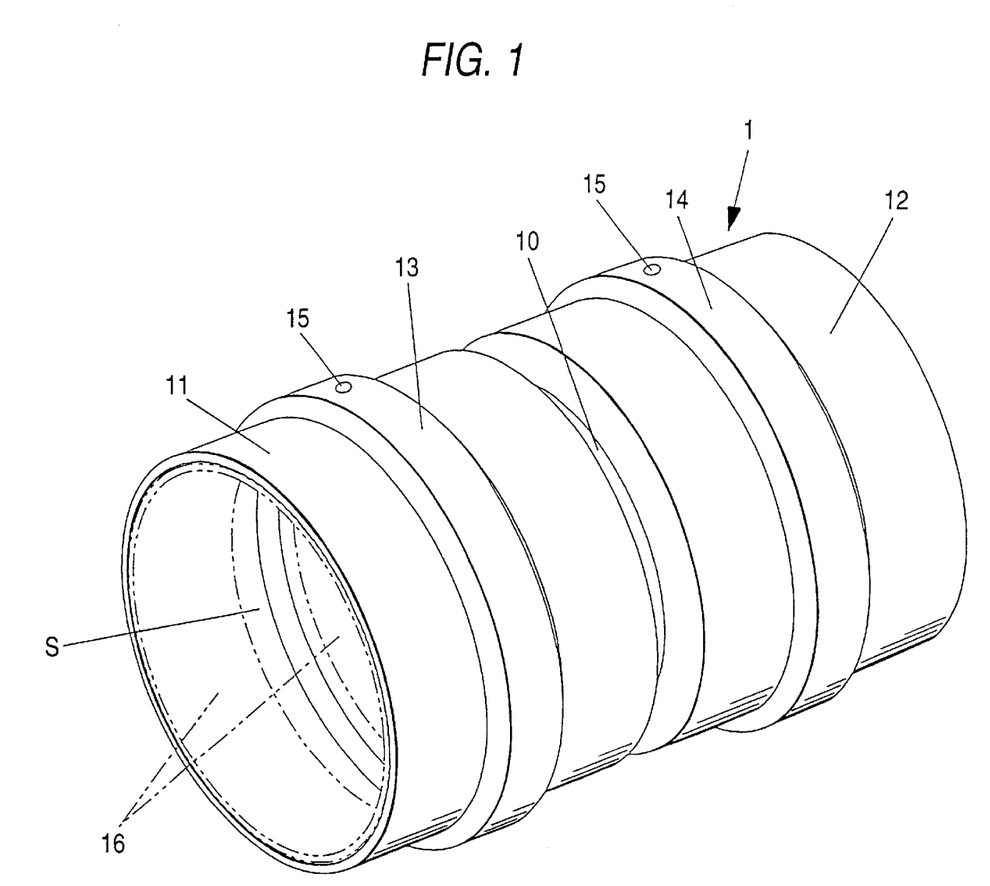
FIG. 1 is a perspective view illustrating the whole of a first embodiment of a joint.
Figure 2:
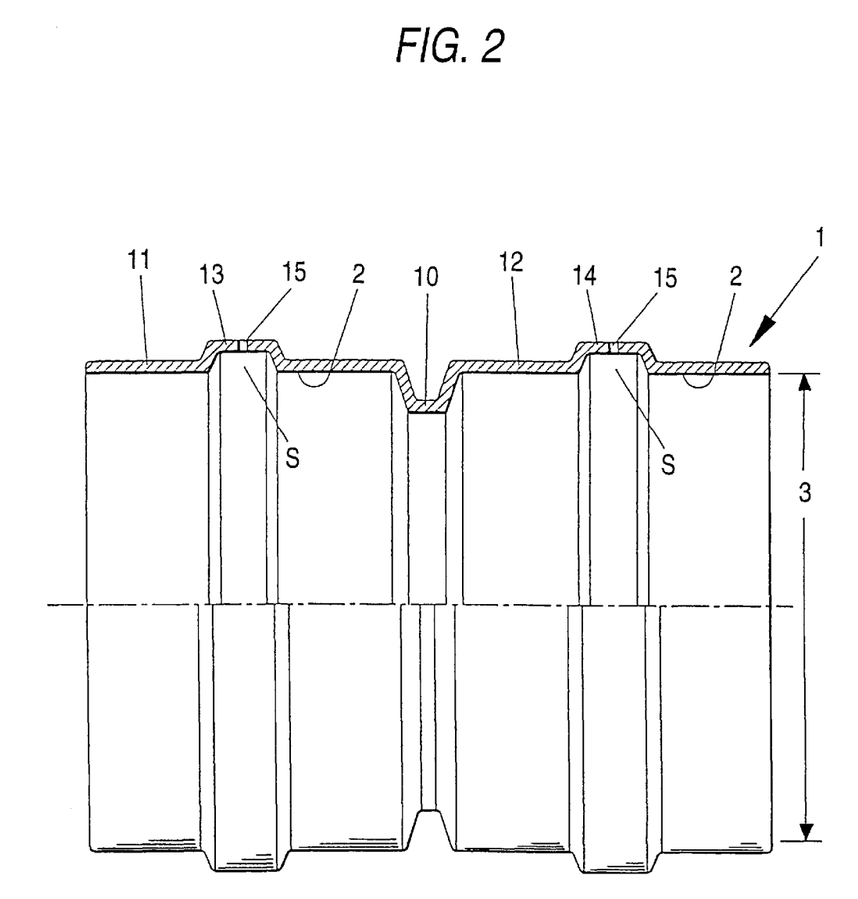
FIG. 2 is a front view of the same joint with its upper-half thereof in vertical section.
Figure 3:
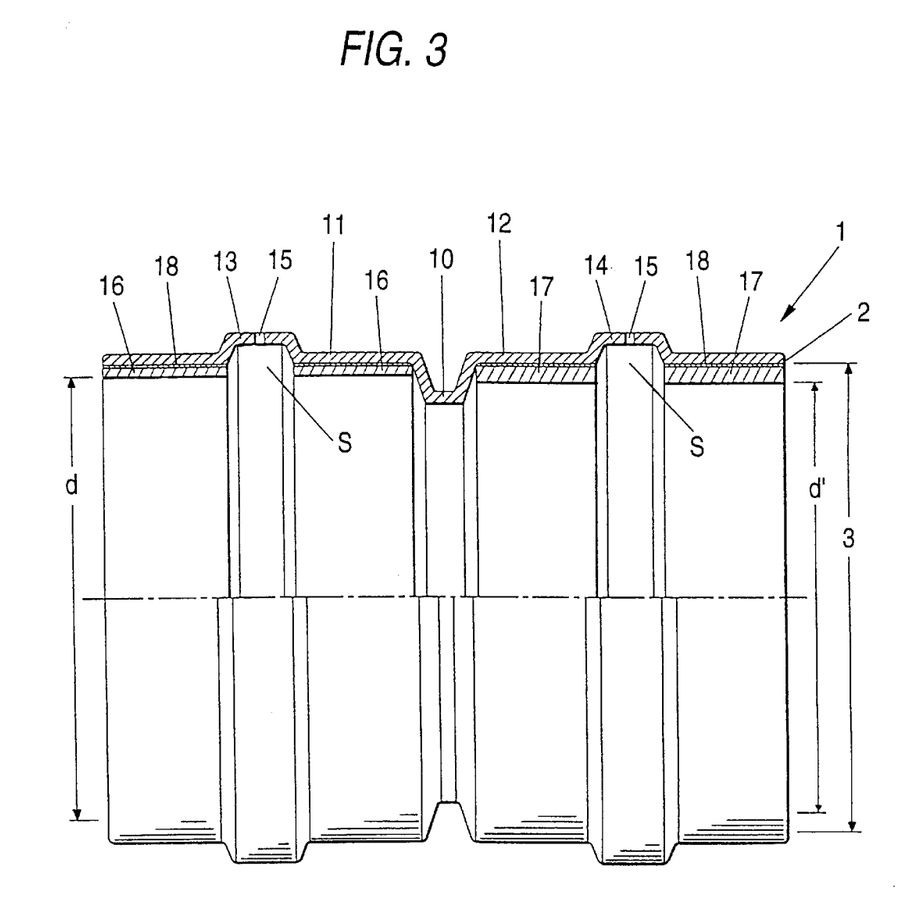
FIG. 3 is a front view of the same joint with its upper-half in vertical section, showing the state where sealing bodies are bonded onto the joint in FIG. 2.
Figure 4:
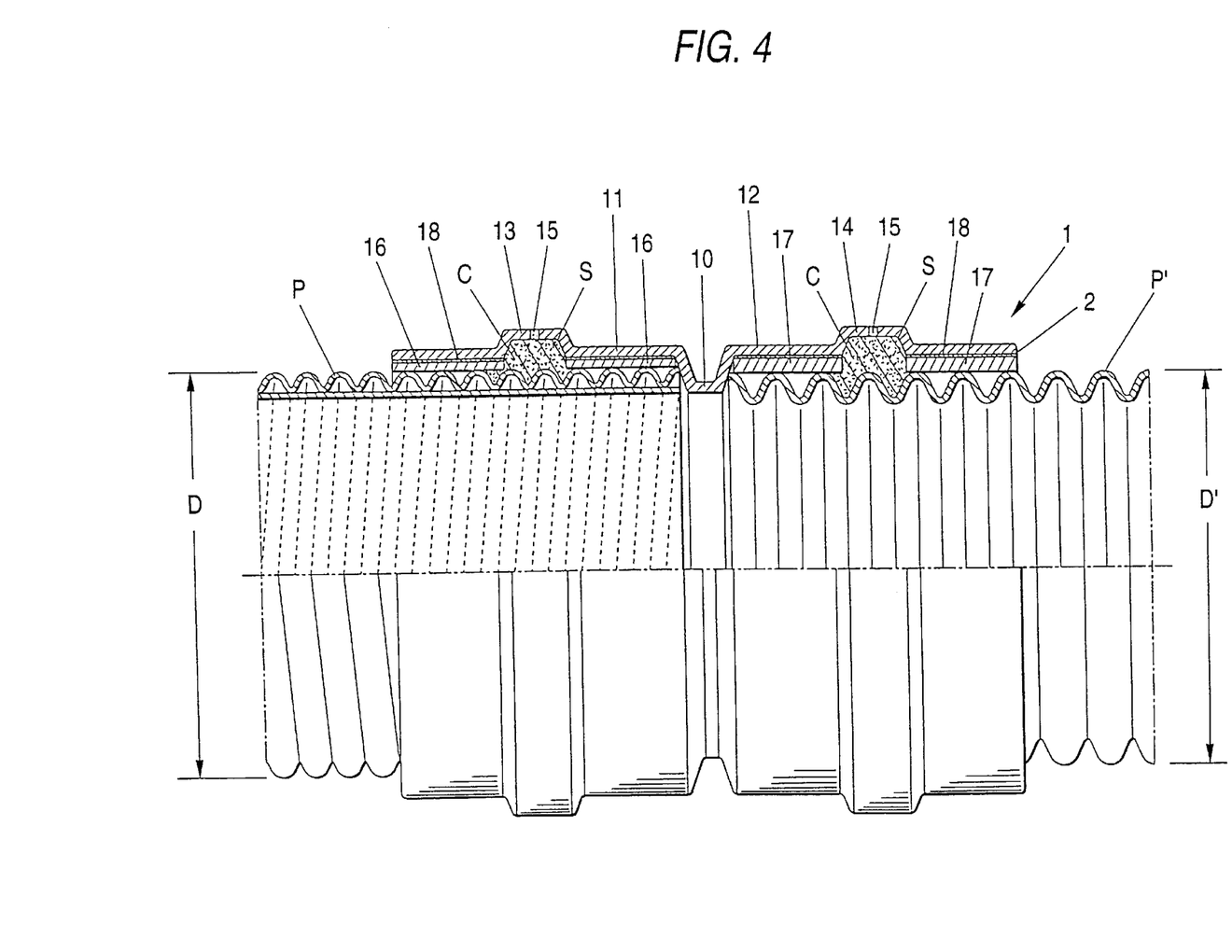
FIG. 4 is a front view of the same joint with its upper-half in vertical section, showing the state where pipes are connected to the joint in FIG. 3.

FIGS. 1 to 4 are diagrams showing a first embodiment of a pipe joint 1 according to the present invention, wherein FIG. 1 is a perspective view illustrating the whole shape, and each of FIGS. 2 to 4 is a diagram illustrating the vertically sectioned upper half portion. The joint 1 is formed by molding a thick tube of hard synthetic resin by a blow molding means. In the structure of the joint 1, the whole is cylindrical and the thickness thereof is about 3 to 10 mm though it varies in accordance with the diameter thereof, the strength of pipes to be connected, and so on. The diameter 3 of the inner circumferential surface 2 of the joint 1 is larger by about 5 to 20 mm than the outer diameter D of a large-diameter one (left pipe P in FIG. 4) of pipes P and P' to be connected. In an approximately intermediate portion in the axial direction, an annular projecting strip 10 is formed so as to project radially inward and so as to have an approximately trapezoid sectional shape as illustrated. Annular projecting portions 13 and 14 projecting radially outward so as to have an approximately trapezoid sectional shape are formed in the respective approximately intermediate portions in first and second cylindrical portions 11 and 12 which are disposed on the opposite sides, that is, left and right sides, of this annular projecting strip 10, and annular space portions S and S are formed respectively in the insides of the annular projecting portions 13 and 14. In addition, small-diameter through holes 15 and 15 for injecting a foamable and curable liquid agent are formed respectively in these annular projecting portions 13 and 14.

In order to connect the pipes P and P' to each other by use of the joint 1 having such a structure as mentioned above, as shown in FIG. 3, sealing bodies 16, 16 and 17, 17 are bonded to the joint 1 annularly on the inner circumferential surfaces on the opposite sides of the annular projecting portion 13 and on the opposite sides of the annular projecting portion 14 of the first and second cylindrical portions 11 and 12, respectively. Each of the sealing bodies is formed in a manner so that a formed body of synthetic resin is cut into a flat band, and the back of the band is coated with a pressure-sensitive bonding agent 18 and pasted with separate paper (not-shown) temporarily so that the flat band can be bonded by separating the separate paper. In this case, the sealing bodies 16 and 17 having suitable thickness are selected and used so that the inner diameters d and d' of the bonded sealing bodies 16 and 17 become approximately equal to or somewhat smaller than the outer diameters of the pipes P and P' to be connected, respectively.

Next, as for a method of connecting the pipes P and P' to be connected to the joint 1 on which the sealing bodies 16 and 17 are bonded in such a manner as described above, the pipes P and P' are pressed into the joint 1 through the open ends thereof till the pipe ends contact with the annular projecting strip 10, as shown in FIG. 4. Then, the through holes 15 and 15 for injecting a foamable and curable liquid agent are position upward, and liquid foamable urethane resin as the curable liquid agent is injected from the through holes 15 and 15 into the space portions S and S surrounded by the outer circumferential surfaces of these pipes P and P', the inner circumferential surfaces of the annular projecting portions 13 and 14 of the joint 1 and the sealing bodies 16, 16 and 17, 17, respectively. The joint 1 is left as it is for a required time, so that the resin expands its volume, these space portions S and S are filled with the foamed and hardened urethane substance (C), and the two pipes P and P' are connected to the joint 1 water-tightly.

In this connection, the sealing bodies 16 and 17 may be bonded not onto the inner circumferential surfaces of the joint 1 but onto the outer circumferential surfaces of the pipes P and P' to be connected. That is, this connection using the joint 1 may be performed in a method comprising the steps of: bonding sealing bodies 16 and 17 of a compressible and deformable material onto outer circumferential surface portions near respective ends of two pipes P and P' to be connected to each other, which come to the opposite sides of the annular projecting portion 13 and the opposite sides of the annular projecting portion 14, respectively, of the joint 1 when the pipes P and ' are inserted into the joint 1, each of the sealing bodies 16 and 17 having such a thickness that the outer diameter of the pipe on which the sealing body is bonded is approximately equal to or slightly larger than the inner diameter of the joint 1; pressing the pipes P and ' into the first and second cylindrical portion 11 and 12 respectively; and injecting a foamable and expanding curable liquid agent into the inside space portions S and S through the corresponding through holes 15 and 15 so that the space portions S and S are filled with foamed and expanded hardened substance C of the liquid agent injected therein to thereby connect the pipes water-tightly.

The connection of the two pipes P and P' by use of this joint 1 may be performed in such a manner as follows. That is, the joint 1 is connected to one pipe end of the pipe P by the above-mentioned connection means in advance in a factory, or the like, and shipped in a state that the joint 1 is connected to the one end of the pipe P, so that only the other pipe P' is connected in the piping site to the joint 1 which is already connected to the pipe end of the pipe P. In this case, there is an advantage that piping work on the piping site can be performed more rapidly and efficiently.

The embodiment shown in FIG. 4 shows the case of the connection of the pipes P and P' to each other, where the pipe P on the left side in the drawing is a pipe having an outer shape which is spirally corrugated while the pipe P' on the right side in the drawing is a pipe having an outer shape which is annularly corrugated, the corrugation pitch of the left pipe P is smaller than that of the right pipe P', and the outer diameter D of the left pipe P is larger than the outer diameter D' of the right pipe P'. Therefore, the sealing bodies 16 and 17 shown in the embodiment have such a relationship that the thickness of the left sealing body 16 is smaller than that of the right sealing body 17, so that the inner diameter d of the left sealing body 16 is larger than the inner diameter d' of the right sealing body 17, as shown in FIGS. 3 and 4.

The sealing bodies 16 and 17 are however formed of a foamed body of synthetic resin, which is a compressible and deformable material as described above, so that the sealing bodies 16 and 17 are not always necessary to have thickness corresponding to the outer diameters of the left and right pipes P and P' to be connected. Even if there is a difference in outer diameter between the two pipes P and P', sealing bodies equal in thickness may be used when the difference is not so large. In addition, although description has been made in the embodiment that the back of each of the sealing bodies 16 and 17 is coated with the pressure-sensitive bonding agent 18 and pasted with separate paper temporarily, a bonding agent 18 may be applied onto the sealing bodies 16 and 17 or the joint 1 at the time of bonding of the sealing bodies.

Figure 5:
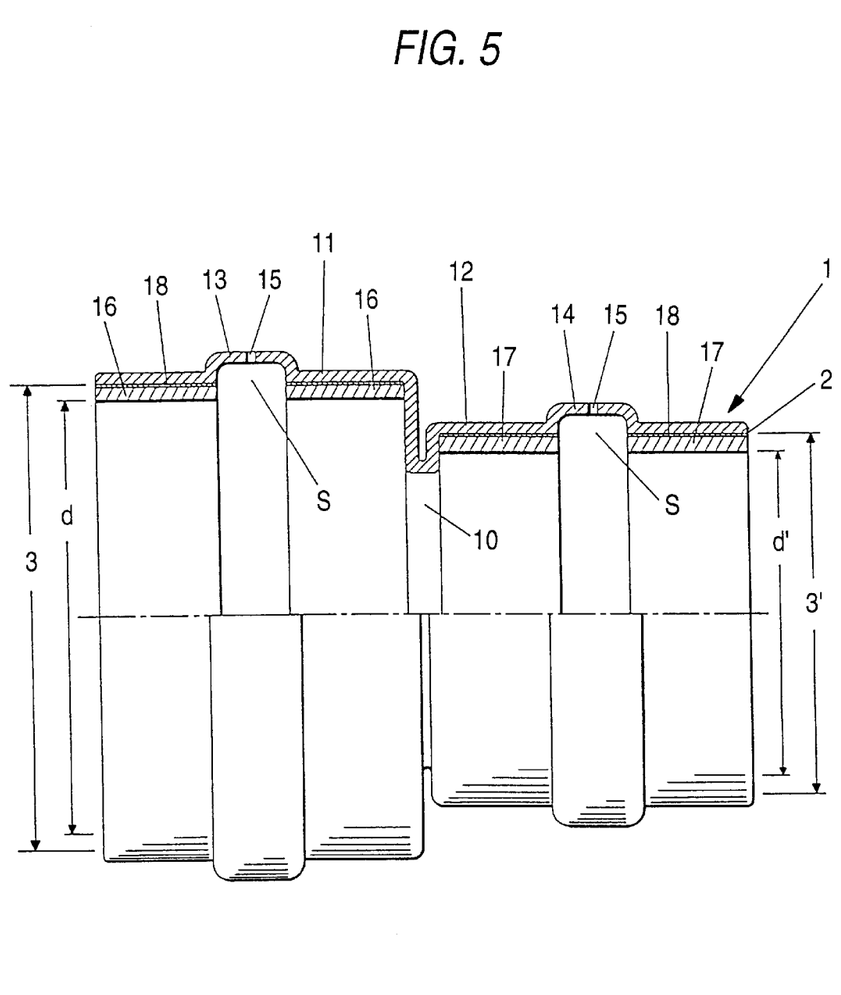
FIG. 5 is a front view of the portion corresponding to FIG. 2, illustrating a joint of a second embodiment.

FIG. 5 is a diagram of a second embodiment, illustrating the structure of a joint 1 and sealing bodies 16 and 17 bonded to an inner circumferential surface 2 of this joint 1. The joint 1 in this embodiment has a structure suitable for connecting two pipes which are different in outer diameter largely from each other. In the joint 1, as shown in FIG. 5, there is a large difference between an inner diameter 3 of its first cylindrical portion 11 on the left side and an inner diameter 3' of its second cylindrical portion 12 on the right side, so that the large and small diameters of the joint 1 approximately agree with the outer diameters of the two pipes P and P' (not-shown) to be connected. Also in this case, however, the connection may be performed in the same manner as described in the first embodiment such that the sealing bodies 16 and 17 are selected so as to have thicknesses corresponding to the outer diameters of the two pipes to be connected, and bonded onto the first and second cylindrical portions 11 and 12, respectively, so as to form the required inner diameters d and d', and then the pipes are connected to the joint. Thus, the method of connection may be performed according to the first embodiment, and the description thereof is therefore omitted.

In order to make the present invention understood easily, the structures of the two pipes P and P' to be connected has been described in the first embodiment such that the pipe P has a spirally corrugated pipe while the other pipe P' has an annularly corrugated wall, and the outer diameters of the two pipes P and P' are different. It is a matter of course that pipes to be connected by use of the joint 1 according to the present invention do not need to be different in kind of shape of corrugation and different in diameter, but the joint 1 may be used for connecting pipes both of which are spirally corrugated, both of which are annularly corrugated, or both of which are the same in diameter. In addition, when no axial force is given to pipes to be connected, or when a liquid agent having an adhesive property with respect to pipes is used as the hardened substance C filling the space portion S, the joint 1 can be used also for connecting non-corrugated smooth pipes to each other or for connecting a smooth pipe to a corrugated pipe. However, the joint 1 according to the present invention has the largest effect in that the joint 1 can be used for connecting pipes which are different in kind of shape of corrugation or pipes which are different in diameter, by adjusting the inner diameters d and d' of the pipes by using sealing bodies.

According to the present invention, the curable liquid agent is not limited to a so-called liquid one but may be a jellied one. In other words, any agent may be used so long as it can be injected from the through hole 15 into the inside space portion S. In addition, preferably, the liquid agent may be a material which has properties of foaming, expanding in volume and being hardened, which is hardened within a predetermined time, and which can be injected to fill the inside space portion S easily. If the liquid agent is rich in adhesive to pipes as mentioned above, it is more preferable since water-tightness can be more ensured.

Although the embodiments which are considered to be representative of the present invention have been described above, the present invention is not always limited to the structure of these embodiments, but it can be carried out by suitable modification within the scope in which the above-mentioned constitutional features of the present invention are provided, the objects of the present invention can be achieved and the following effects can be produced.

As apparent from the above description, a joint according to the present invention has such a structure that in a cylindrical body having inner diameter larger than any of the outer diameters of two pipes to be connected, an annular projecting strip projecting radially inward is formed in an approximately axially intermediate portion of the cylindrical body, annular projecting portions projecting radially outward for providing annular space portions are formed respectively in approximately intermediate portions of first and second cylindrical portions disposed on the opposite sides of the annular projecting strip, and through holes for injecting a foamable and curable liquid agent are formed respectively in these two annular projecting portions. Accordingly, the joint has a unique effect, which cannot be expected in conventional joints, in the point that the two pipes to be connected are not necessary to be identical in kind, but may be different in kind of shape of corrugation or in outer diameter, and they can be connected without any problem by suitably selecting the thickness of sealing bodies to be bonded onto the inner surfaces of the joint to thereby adjust the inner diameter of the joint.

In addition, since the annular projecting portions are formed in the first and second cylindrical portions respectively, a hardened substance of the injected liquid agent fills the gaps between the inner circumferential surfaces of these annular projecting portions and the corrugated outer circumferential surfaces of pipes in the case where the pipes to be connected are corrugated ones, so that the joint and the pipes are prevented from moving relative to each other, particularly from moving relative to each other in the axial direction. Accordingly, the joint has a further effect that both the pipes can be connected water-tightly easily.

In addition, in the method of connecting pipes, even if the pipes to be connected are different in outer diameter as mentioned above, the two pipes are held concentrically by using the joint according to the invention, and by selecting and bonding sealing bodies different in thickness, and a curable liquid agent is injected from the through holes and hardened while this concentric state is kept. Accordingly, the method has an effect that pipes, even if they are different in diameter, can be connected concentrically water-tightly, rapidly and surely, without producing positional discrepancy.

What is claimed is:

1. A joint for connecting different-diameter pipes, at least one of said different-diameter pipes being a corrugated pipe, said joint comprising a cylindrical body having at least one inner circumferential surface with a diameter adapted to be larger than outer diameters of said different-diameter pipes, said cylindrical body having an axially intermediate portion, wherein said cylindrical body comprises:

an annular inward projection projecting radially inward from said axially intermediate portion of said cylindrical body;

a first cylindrical portion positioned at a first side of said annular inward projection and having a first inner surface;

a second cylindrical portion positioned at a second side of said annular inward projection and having a second inner surface;

a first annular outward projection projecting radially outward from said first cylindrical portion and forming a first annular space in said first cylindrical portion;

a second annular outward projection projecting radially outward from said second cylindrical portion and forming a second annular space in said second cylindrical portion;

a first through-hole formed in said first annular outward projection for receiving a foamable and curable liquid agent;

a second through-hole formed in said second annular outward projection for receiving said foamable and curable liquid agent;

a first sealing body connected to said first inner surface, said first sealing body comprising a first flat annular band positioned adjacent said first annular outward projection and a second flat annular band positioned adjacent said first annular outward projection opposite said first flat annular band; and a second sealing body connected to said second inner surface, said second sealing body comprises a third flat annular band positioned adjacent said second annular outward projection and a fourth flat annular band positioned adjacent said second annular outward projection opposite said third flat annular band, said first sealing body and said second sealing body comprising a compressible and deformable material.

2. A joint for connecting different-diameter pipes as claimed in claim 1, wherein said first cylindrical portion has a diameter adapted to be larger than said outer diameters of said different-diameter pipes, and said second cylindrical portion has a diameter adapted to be larger than an outer diameter of a first pipe of said different-diameter pipes and smaller than an outer diameter of a second pipe of said different-diameter pipes.

3. A joint as in claim 1, wherein said annular inward projection, said first annular outward projection and said second annular outward projection have a trapezoid cross-sectional shape.

4. A joint as in claim 1, wherein said first sealing body and said second sealing body comprise foamed flat annular bands of synthetic resin having a pressure-sensitive bonding agent.

5. A joint as in claim 1, wherein said foamable and curable liquid agent is expandable for filling a first space between said first annular outward projection and a first pipe of said different-diameter pipes and is expandable for filling a second space between said second annular projection and a second pipe of said different-diameter pipes.

6. A joint for connecting different-diameter pipes as claimed in claim 1 wherein a width of at least one of said first and second cylindrical portions is adopted to be greater than a pitch of said at least one corrugated pipe of said different-diameter pipes.

7. A joint for connecting different-diameter pipes as claimed in claim 1 wherein at least one of said first and second sealing bodies will be contacts with said at least one corrugated pipe of said different-diameter pipes and has a width which is adopted to be greater than a pitch of said at least one corrugated pipe of said different-diameter pipes.

8. A joint for connecting different-diameter pipes- the joint comprising a cylindrical body having at least one inner circumferential surface with a diameter adapted to be larger than outer diameters of said different-diameter pipes, said cylindrical body having an axially intermediate portion, wherein said cylindrical body comprises:

an annular inward projection projecting radially inward from said axially intermediate portion of said cylindrical body;

a first cylindrical portion positioned at a first side of said annular inward projection and having an first inner surface;

a second cylindrical portion positioned at a second side of said annular inward projection and having a second inner surface;

a first annular outward projection projecting radially outward from said first cylindrical portion and forming a first annular space in said first cylindrical portion;

a second annular outward projection projecting radially outward from said second cylindrical portion and forming a second annular space in said second cylindrical portion;

a first through hole formed in said first annular outward projection for receiving a foamable and curable liquid agent;

a second through hole formed in said second annular outward projection for receiving said foamable and curable liquid agent;

a first sealing body connected to said first inner surface; and a second sealing body connected to said second inner surface, said first sealing body and said second sealing body comprising a compressible and deformable material, wherein a thickness of said first sealing body is different than that of said second sealing body.

9. A cylindrical joint for connecting different-diameter pipes, at least one of said different-diameter pipes being corrugated pipe, said cylindrical joint comprising:

an annular inward projection projecting radially inward from said cylindrical joint;

a first cylindrical portion positioned at a first side of said annular inward projection, and having a first inner surface having an inner diameter larger than an outer diameter of a first pipe of said different-diameter pipes;

second cylindrical portion positioned at a second side of said annular inward projection, and having a second inner surface having an inner diameter larger than an outer diameter of a second pipe of said different diameter pipes;

a first annular outward projection projecting radially outward from said first cylindrical portion and forming a first annular space in said first cylindrical portion;

a second annular outward projection projecting radially outward from said second cylindrical portion and forming a second annular space in said second cylindrical portion;

a first through-hole formed in said first annular outward projection for receiving a foamable and curable liquid agent;

a second through-hole formed in said second annular outward projection for receiving said foamable and curable liquid agent;

a first sealing body connected to said first inner surface, said first sealing body comprising a first flat annular band positioned adjacent said first annular outward projection and a second flat annular band positioned adjacent said first annular outward projection opposite said first flat annular band; and a second sealing body connected to said second inner surface, said second sealing body comprising a third flat annular band positioned adjacent said second annular outward projection and a fourth flat annular band positioned adjacent said second annular outward projection opposite said third flat annular band, said first sealing body and said second sealing body comprising a compressible and deformable material.

10. A joint as in claim 9, wherein said annular inward projection, said first annular outward projection and said second annular outward projection have a trapezoid cross-sectional shape.

11. A joint as in claim 9, wherein said first sealing body and said second sealing body comprise foamed flat annular bands of synthetic resin having a pressure-sensitive bonding agent.

12. A joint as in claim 9, wherein said foamable and curable liquid agent is expandable for filling a first space between said first annular outward projection and a first pipe of said different-diameter pipes and is expandable for filling a second space between said second annular projection and a second pipe of said different-diameter pipes.

13. A cylindrical joint for connecting different-diameter pipes as claimed in claim 9 wherein a width of at least one of said first and second cylindrical portions is adopted to be greater than a pitch of said at least one corrugated pipe of said different-diameter pipes.

14. A cylindrical join for connecting different-diameter pipes as claimed in claim 9 wherein at least one of said first and second sealing bodies contacts with said at least one corrugated pipe of said different-diameter pipes and has a width which is adopted to be greater than a pitch of said at least one corrugated pipe of said different-diameter pipes.

15. A joint for joining pipes comprising:

a cylindrical body having an inner surface and an outer surface;

an annular inward projection projecting inwardly from said inner surface;

a first annular outward projection projecting outwardly from said outer surface and forming a first annular space along said inner surface;

a second annular outward projection projecting outwardly from said outer surface and forming a second annular space along said inner surface;

at least one first opening through said first annular outward projection;

at least one second opening through said second annular outward projection;

a first sealing body positioned on said inner surface adjacent said first annular outward projection, said first sealing body comprising a first flat annular band positioned adjacent said first annular outward projection and a second flat annular band positioned adjacent said first annular outward projection opposite said first flat annular band;

a second sealing body positioned on said inner surface adjacent said second annular outward projection, said second sealing body comprising a third flat annular band positioned adjacent said second annular outward projection and a fourth flat annular band positioned adjacent said second annular outward projection opposite said third flat annular band; and a foamable adhesive, injected through said first opening and said second opening into said first annular space and said second annular space, for forming a water-tight seal between said inner surface and said pipes.

16. A joint as in claim 15 wherein said annular inward projection, said first annular outward projection and said second annular outward projection have a trapezoid cross-sectional shape.

17. A joint as in claim 15 wherein said first sealing body and said second sealing body comprise foamed flat annular bands of synthetic resin having a pressure-sensitive bonding agent.

18. A joint as in claims 15, wherein said foamable adhesive is expandable to fill said first annular space and said second annular space.

* * * * *